United States Patent
Sabatino

(10) Patent No.: US 6,735,438 B1
(45) Date of Patent: May 11, 2004

(54) ANTENNA FOR AIR-TO-GROUND COMMUNICATION

(75) Inventor: Anthony Sabatino, Lenexa, KS (US)

(73) Assignee: Sprint Spectrum, L.P., Overland Park, KS (US)

(*) Notice: Subject to any disclaimer, the term of this patent is extended or adjusted under 35 U.S.C. 154(b) by 356 days.

(21) Appl. No.: 09/638,231

(22) Filed: Aug. 14, 2000

(51) Int. Cl.[7] .................................................. H04Q 7/20
(52) U.S. Cl. ....................... 455/427; 455/431; 455/448; 455/12.1; 343/705; 343/835
(58) Field of Search ................................ 455/427, 431, 455/11.1, 12.1, 13.3, 422.1, 448, 13.2, 562.1, 13.1; 343/705, 835, 874, 890

(56) References Cited

U.S. PATENT DOCUMENTS

| | | | |
|---|---|---|---|
| 5,128,873 A | * 7/1992 | Gilmour | 364/451 |
| 5,444,762 A | 8/1995 | Frey et al. | |
| 5,519,761 A | 5/1996 | Gilhousen | |
| 5,557,656 A | 9/1996 | Ray et al. | |
| 5,832,380 A | 11/1998 | Ray et al. | |
| 5,854,986 A | * 12/1998 | Dorren | 455/562 |
| 5,859,618 A | 1/1999 | Miller, II et al. | |
| 5,878,345 A | * 3/1999 | Ray | 455/431 |
| 5,937,332 A | 8/1999 | Karabinis | |
| 5,950,129 A | 9/1999 | Schmid et al. | |
| 5,970,408 A | 10/1999 | Carlsson et al. | |
| 6,023,243 A | 2/2000 | Frank | |
| 6,029,064 A | 2/2000 | Farris et al. | |
| 6,032,020 A | 2/2000 | Cook et al. | |
| 6,061,562 A | 5/2000 | Martin et al. | |
| 6,173,191 B1 | * 1/2001 | Jennings, III | 455/562.1 |
| 6,285,878 B1 | * 9/2001 | Lai | 455/431 |
| 6,324,398 B1 | * 11/2001 | Lanzerotti et al. | 455/431 |

FOREIGN PATENT DOCUMENTS

WO   WO 99/22465   5/1999

OTHER PUBLICATIONS

Chryssomallis, (Jun. 2000), Smart Antennas, *IEEE Antennas and Propagation Magazine*, vol., 42, No. 3, pp. 129–136.
Lee et al., (Jun. 2000), Evaluation of Directivity for Planar Antenna Arrays, *IEEE Antennas and Propagation Magazine*, vol., 42, No. 3, pp. 64–67.

* cited by examiner

Primary Examiner—William Trost
Assistant Examiner—Brandon Miller

(57) ABSTRACT

A system and method for providing wireless communication services to passengers of an aircraft through the use of a standard mobile telephone. A system of antennas on an air base station radiates above a horizontal plane in order to provide coverage for an aircraft flying through a service airspace. The air system may be conveniently overlaid on an existing terrestrial wireless system in order to share based station facilities. A stretched dome shaped antenna pattern provides 360 degrees of coverage in the horizontal plane. A cardioid direction antenna pattern in the horizontal plane provides coverage in a specific portion of the air space such as an air corridor. Various combinations of antennas, and transceivers are interconnected in order to provide the proper coverage, capacity and interference control requirements for a particular air cell.

9 Claims, 14 Drawing Sheets

ANTENNA FOR AIR-TO-GROUND COMMUNICATION

BACKGROUND OF THE INVENTION

1. Field of the Invention

The present invention relates to a wireless communication system for use with aircraft. More particularly, the invention relates to a method and system for providing wireless communication service in an air-space communication system.

2. Background Technology

The growth of telecommunications and the desire for mobile connectivity has increased the demand for public telecommunication services while in flight. In an effort to satisfy the demand for in-flight telecommunications, commercial aircraft are often equipped with a special ground-to-air communication system in order to provide passengers with public phone and/or data service. However, in-flight public phone systems largely use air interface protocols that are not compatible with conventional mobile telecommunication systems. Furthermore, airline passengers are typically not permitted to use personal mobile telephones while in flight due to possible interference with aircraft systems and with the ground-based wireless systems.

In contrast to in-flight phone and/or data systems, conventional mobile telecommunications systems permit mobile subscribers to access the PSTN (Public System Telephone Network) or other network by using a cellular infrastructure system intended for communications on the earth's surface. Generally, mobile systems may be designed to maximize two equally important parameters. The first major parameter is coverage. Coverage provides an adequate radio communication link between the base station and the mobile user. The second major parameter is capacity. Capacity ensures that the system can handle the demand or load by mobile users collectively.

COVERAGE

The mobile coverage area of a system is generally based primarily on the type of terrain, the transceiver equipment performance requirements for a given telecommunications standard, and the level of RF interference. Coverage is primarily limited by two major factors: the strength of the signal and the quality of the signal. The strength of the signal is based on the propagation characteristics of the signal. The quality of the signal is based on impairments to a signal, primarily due to interference.

The propagation characteristics of radio waves in free-space are different from the propagation characteristics of radio waves along the earth's surface. Normally, radio waves propagate further in free space than along the surface of the earth. The free-space propagation of radio waves is characterized by the "Frenel zone," which sets forth the spatial terrain requirements that will permit free-space propagation. As a result, communications between a base station and an aircraft may take place over greater distances than communications between a base station and a mobile unit located on the earth's surface.

Presently, if an aircraft in an air-to-ground system transmits on the same frequencies as a ground cellular system, the air-to-ground system will likely interfere with the ground cellular system. Due to the extensive free-space propagation, transmissions from an airplane are broadcast over a large area of the earth's surface, possibly interfering with one or more ground base stations. This is a primary reason why mobile subscribers are currently prohibited from operating mobile units, such as their personal telephones or other mobile communication devices, on aircraft.

For example, the propagation characteristics of radio waves in a typical suburban area at 800–900 MHz may be expressed as follows:

$$\text{Received signal} = -61.7 \text{ dBm} - 38.4 \text{ dB log radius (miles)}$$

where the radius is the distance between the base station and the mobile station in miles, and the received signal is the signal strength in dBm at the receiver of the mobile station. William C. Y. Lee, "Mobile Communications Engineering", McGraw-Hill, N.Y. 1982, pp 108. If the minimum receive signal at the receiver is $-100$ dBm, then the radius of a typical suburban cell site at 800–900 MHz is about 10 miles (16 Km). A ground base station cell radius may typically vary from approximately 0.5 kilometers to approximately 20 kilometers or more.

However, due to the extent of free space propagation, a similar base station adapted for in-flight communications may have a radius of up to 500 kilometers or more. The actual cell radius will depend on factors such as the power budget of the system, which takes into account transmit output power, path loss between the transmitter and the receiver, transmission line losses in, the transmit and receive paths, fade margin, and receiver sensitivity.

CAPACITY

System capacity, the second parameter to be maximized in a mobile system, is a function of the available spectral bandwidth and the RF interference rejection performance of the system equipment. Mobile telecommunications systems utilize large amounts of bandwidth to provide commercial grade telephony service to tens or thousands of mobile users in a service area. Lower interference levels, and thus greater system capacity, results from having a larger spectral bandwidth. The FCC (Federal Communications Commission), however, limits spectral bandwidth allocations. Consequently, in order to meet subscriber service demands, RF engineering techniques such as interference analysis and optimization (e.g., frequency re-use, and power control) may be used to optimize this limited available bandwidth. Some of these techniques, however, adversely affect interference levels. Frequency re-use in many systems for instance, is a principle generator of RF interference in a mobile system.

INTERFERENCE

Because system interference directly affects both capacity and coverage, characterizing such interference is desirable. Since most mobile systems are bi-directional interference may affect both a forward communication link and a reverse communication link. Communication from a base station to a mobile unit is known as the forward link. Communication from the mobile unit to the base station is known as the reverse link. Interference on the forward link exists when the mobile unit's receiver experiences interference from base stations other than the intended base station. Interference on the reverse link exists when the transmit carrier from the mobile unit to the base station is interfered with by other transmitting mobile units in the system. In both the forward and the reverse links, the intended transmit carrier may be referred to as carrier "C", and interference created by other mobile unit transmitters may be referred to as interference "I".

The mobile subscriber units and system infrastructure communication equipment operating in a mobile system are typically capable of tolerating a specified maximum ratio of RF carrier to interference known as a C/I (Carrier-to-Interference) ratio. The C/I ratio may, for example, be based on an applicable telecommunications standard (e.g., IS-95, IS-54, G3, etc.). So long as the ratio of the intended receive carrier signal to the system interference at the receiver meets or exceeds the specified C/I ratio, communications between the mobile user and the base station are able to function properly. However, if the ratio of the intended receive carrier signal to the system interference at the receiver does not meet or exceed the specified C/I ratio, then the mobile unit's receiver may not be able to reliably receive the signal, and communication may fail or be of poor quality. For example, a C/I ratio of 6 dB may be required for a CDMA (Code Division Multiple Access) air interface such as IS-95, while a C/I ratio of 18 dB may be required for an analog air interface standard such as AMPS (Advanced Mobile Phone Service).

Besides available spectral bandwidth, system interference is dependent upon the distribution of subscribers. For example, the maximum concentration of subscribers is significant, because, if subscriber concentration is high enough, then the C/I ratio may exceed a maximum allowable C/I ratio. If subscriber concentration is too high, then the air system may need to be reconfigured to reduce the interference.

One technique for controlling interference is to use a directional antenna to direct transmissions to a desired area. For example, a typical omni-directional cellular base station has a tower-mounted antenna that radiates outward radially from the antenna in a 360 degree pattern in the horizontal plane, but with a slight downward tilt to prevent radiating energy into the surrounding airspace. Similarly, a directional antenna transmits in less than a 360 degree pattern in the horizontal plane, and may also transmit with a slight downward tilt to prevent radiating energy into the airspace.

Radiation patterns along the earth's surface are optimal for ground-based users because the radiated RF signal is directed approximately to the surface of the coverage area where antennas on mobile units are most likely to be located. Transmission into the airspace above the ground-based coverage area is undesirable in a conventional ground system because of the possibility of a direct or reflected wave causing interference elsewhere in the system. Therefore, conventional ground-based cellular telecommunications systems do not support air-to-ground communications, because the antenna radiation patterns avoid vertical radiation.

U.S. Pat. No. 5,878,345, (the '345 patent) entitled "Antenna For Nonterrestrial Mobile Telecommunication System," the contents of which are incorporated herein by reference, describes an antenna pattern that is substantially parabolic in shape, as is shown in FIG. 1. A disadvantage of such a parabolic antenna pattern is that an aircraft may experience gaps in coverage between cell sites because the horizontal radius of the cell site is smaller at lower altitudes. Therefore, an aircraft flying at a lower altitude may experience "dead zones" in between cell sites, causing a loss of signal between the aircraft and the cell-site. The '345 patent also proposes a substantially cylindrical radiation pattern, as is shown in FIG. 2. An antenna having such a pattern is difficult or impossible to design and build, however. FIG. 3 illustrates an antenna pattern occupying a central hole in a toroid and extending upward in a substantially conical manner. The deep null in the center of this radiation pattern has very little or no signal, which may result in a loss of signal between the antenna and an aircraft. In addition, the curvature of the pattern near the null is a problem for aircraft flying in a horizontal plane because the curvature of the toroid does not correspond to the shape of a typical flight path for an aircraft.

A further disadvantage of the system described in the '345 patent is that the specified air interface differs substantially from standard air interfaces used in public ground-based systems. Consequently, users are unable to use their own personal mobile phones on the aircraft unless a base station is placed on the aircraft.

U.S. Pat. No. 5,444,762, entitled "Method and Apparatus for reducing interference among cellular telephone signals," the contents of which are incorporated herein by reference, proposes a single-loop aircraft antenna producing a radiation pattern having a substantially conical null above and below a toroid in a vertical plane at the aircraft. No base station antenna pattern is set forth. A vertical plane may be a plane indicating different levels of altitude relative to the earth. With such an aircraft antenna, the aircraft may experience gaps in coverage while flying over a base station, due to the nulls in the pattern. A further disadvantage is that the described aircraft antenna radiates both above and below the aircraft. Therefore, a portion of the energy radiated is wasted because communication will typically occur below the aircraft.

Thus, it would be desirable to provide an air-to-ground communication system in which an air-to-ground communications are supported between a mobile wireless communication unit on an aircraft and a base station located at or near the ground.

It would also be desirable to provide an air-to-ground communication system in which compliance with mobile system interference specifications is promoted.

It would additionally be desirable to provide an air-to-ground communication system in which a region's air-to-ground base station antennas have radiation patterns that conform to typical flight paths or corridors for the region's airspace. An air corridor may, for example, be a common flight path taken by aircraft.

It would further be desirable to provide interference isolation between a ground-based mobile system and an air-to-ground mobile system.

It would also be desirable to provide wireless communication service to an aircraft's passengers, based on a conventional ground telecommunications standard so that the passengers could use their personal mobile units both on the ground and on an aircraft above the ground.

SUMMARY OF THE INVENTION

The present invention provides an improved method and system for providing air-to-ground communication services. According to an exemplary embodiment of the invention, an air antenna system defines a dome shaped radiation pattern having a large radius of curvature in the center of the dome. Alternatively, the air antenna system is defined by a cardioid radiation pattern. This arrangement provides interference isolation between an air-based system and a ground system by directing the coverage of the air system above a horizontal plane.

Two or more antenna elements may be combined to provide coverage specifically for an air corridor. By radiating only in the air corridor, interference in an adjacent ground system is reduced. Advantageously, an exemplary embodiment of the invention may provide the required levels of interference isolation between the air-based and ground system by isolating the coverage of the air system above a horizontal plane to an upward vertical direction.

It is thus an object to provide an air-to-ground communication system for air space coverage using a vertical antenna overlay onto an existing ground system. In accordance with an exemplary embodiment, an air base station is co-located with a terrestrial base station. The air base station includes a plurality of transceivers, an antenna system, and the necessary interconnecting hardware such as splitters and combiners. The base station may be configured to provide the required capacity of an air cell by adding transceivers using splitters and combiners. Coverage of an air cell may be achieved through the use of a stretched dome antenna or a plurality of directional antennas oriented in the specific regions requiring coverage.

The aircraft may communicate with the air base station via an external antenna mounted on the exterior of the aircraft. Passengers using their mobile phones, may originate and receive calls from within the aircraft via repeater equipment in the aircraft coupled to the external antenna.

Another object is to provide wireless communication service to an aircraft through the use of a passenger's mobile telephone based on a conventional ground telecommunications standard. Further, techniques such as frequency reuse, adaptive power control and P.N. (pseudorandom number) reuse planning may be used to optimize the system.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, in which.

DETAILED DESCRIPTION

Air-to-Ground Communication System

Figure 1:
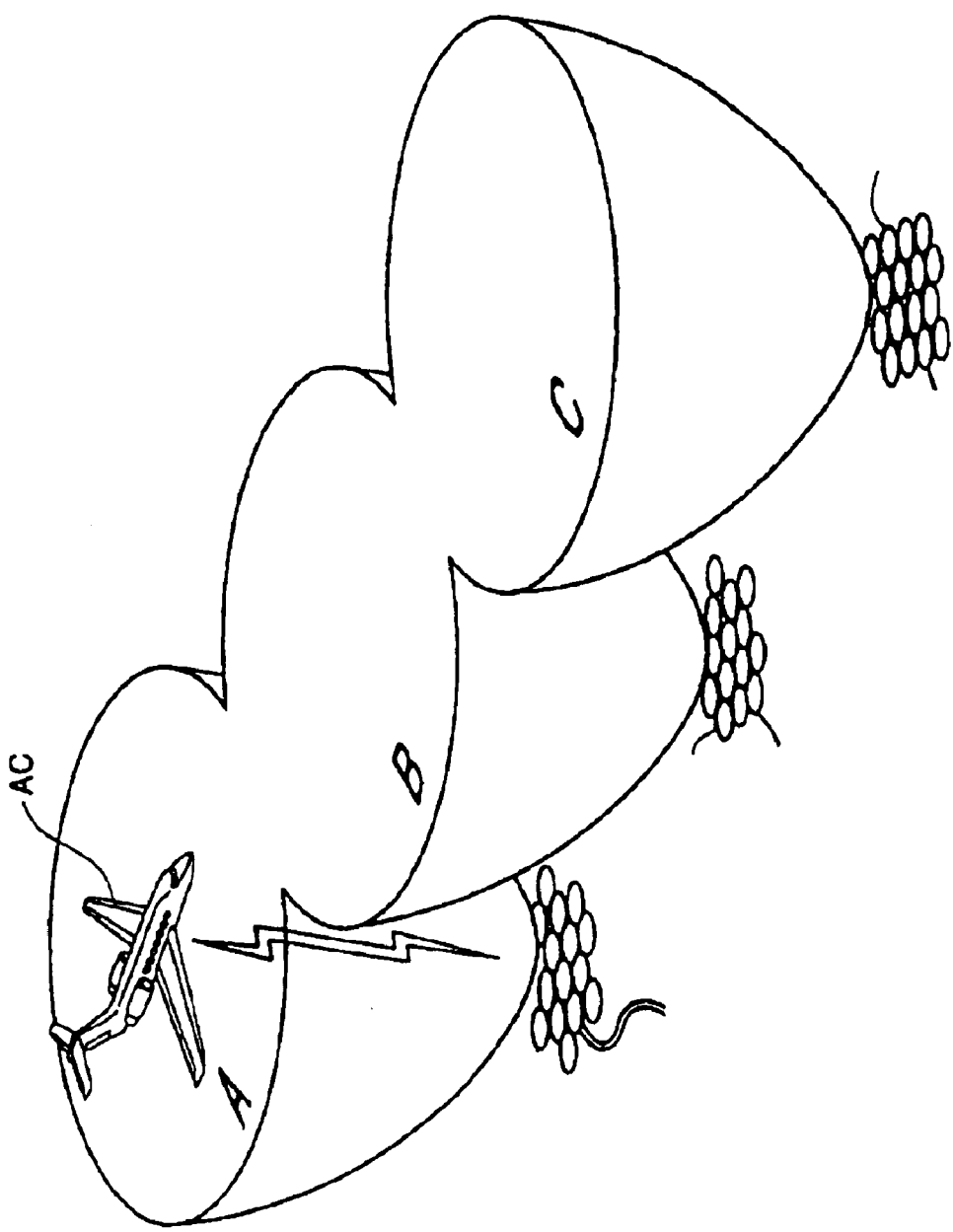
FIG. 1 illustrates a group of base stations each with an antenna having a parabolic propagation pattern in the vertical plane.
Figure 2:
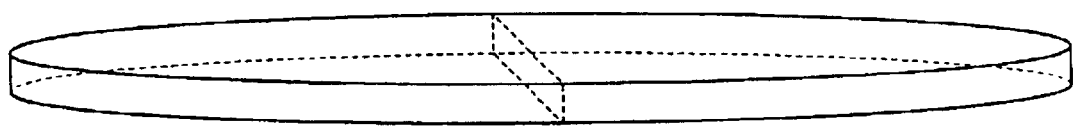
FIG. 2 illustrates a base station with an antenna having a cylindrical propagation pattern.
Figure 3:
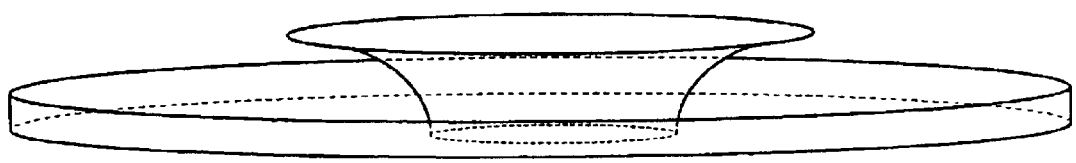
FIG. 3 illustrates a base station with an antenna pattern having a type of toroid propagation pattern.
Figure 4:
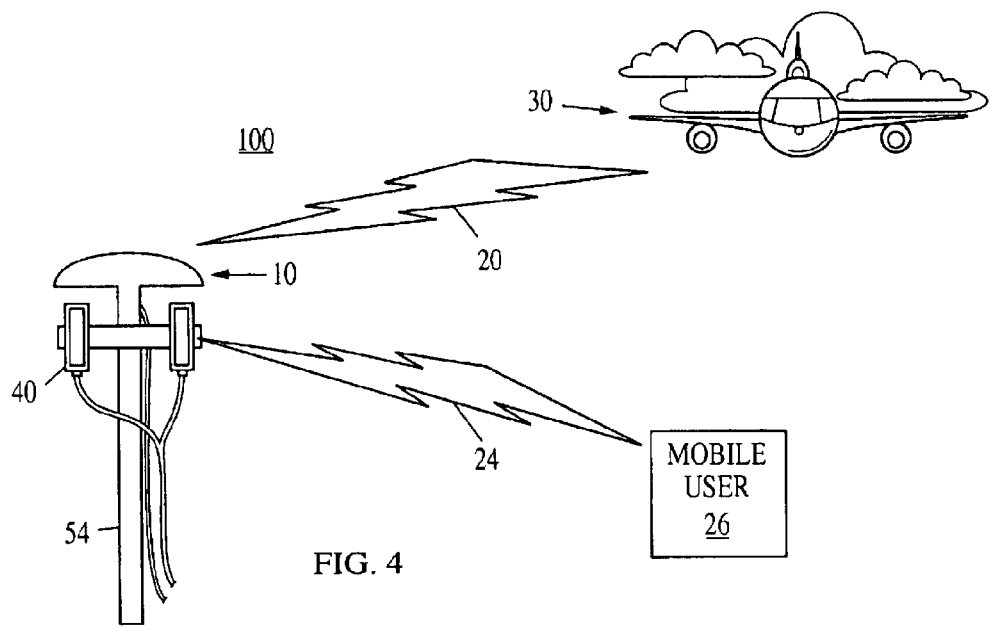
FIG. 4 illustrates a system for providing wireless communication between an aircraft and a base station co-located with a ground base station according to an embodiment of the present invention.

FIG. 4 illustrates an exemplary system 100 for providing a wireless communication service. The system 100 includes an air base station antenna 10 and an aircraft 30, which may communicate over a first air interface 20. In the preferred embodiment, the air base station antenna 10 is co-located with a ground base station antenna 40 forming an air overlay and a ground underlay network. The air base station antenna 10 and the ground base station antenna 40 are mounted on the same pole 54 in one embodiment. The base station antenna 10 may be mounted on a pole 54, building, or other suitable mounting point either separately from or with the ground base station antenna 40. Alternatively, the base station antenna 10 may be mounted on the ground, given that the signal is radiating from the ground skyward.

A mobile user 26 is linked to the ground base station 40 over air interface 24. The system 100 provides wireless communication using a conventional ground system air-interface standard (e.g. IS-95A/B, IS-136, G3, CDMA2000 etc.). By using an air interface 20 standard compatible with a conventional ground system air interface 24, a passenger may use a mobile telephone 26 on an aircraft 30. Aircraft 30 may be an airplane or any other entity capable of flying (e.g. a helicopter, satellite, jet, blimp, glider, etc.).

Figure 5:
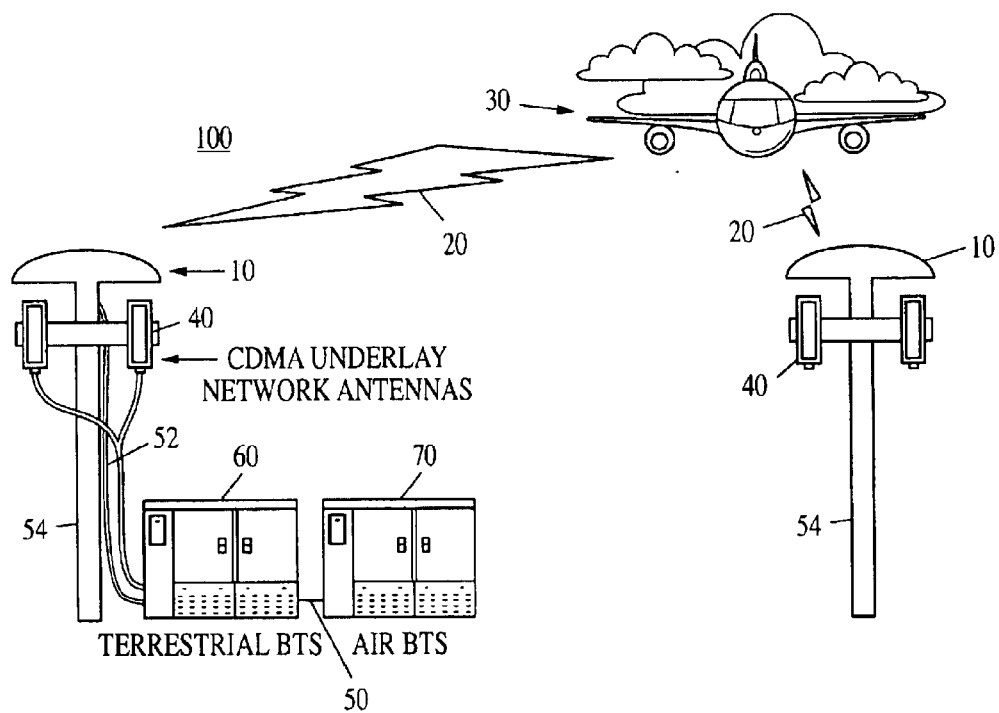
FIG. 5 illustrates a system for providing wireless communication between a base station and an aircraft according to an embodiment of the present invention.

FIG. 5 illustrates a system for providing wireless communication between a base station antenna 10 and an aircraft 30 according to a preferred embodiment of the present invention. An air base station antenna 10 is linked to an aircraft 30 over an air interface 20. A transmitted signal over the air interface 20 may be either horizontally or vertically polarized. Air base station antenna 10 is coupled to air BTS (Base Transceiver Station) 70 via transmission line feed 50.

Ground base station antenna 40 is coupled to ground BTS 60 via transmission line feed 52. The air base station antenna 10 may, for example, be dome-shaped. Alternatively, the air base station antenna 10 may be a vertical-type antenna with a 360 degree radius of operation, or a directional antenna (which has less than a 360 degree radius of operation in the horizontal plane). The air base station antenna 10 may still take other forms as well. Ground base station antenna 40 may be co-located with air base station antenna 10 according to one embodiment of the invention.

Antenna Radiation Patterns

Figure 6:
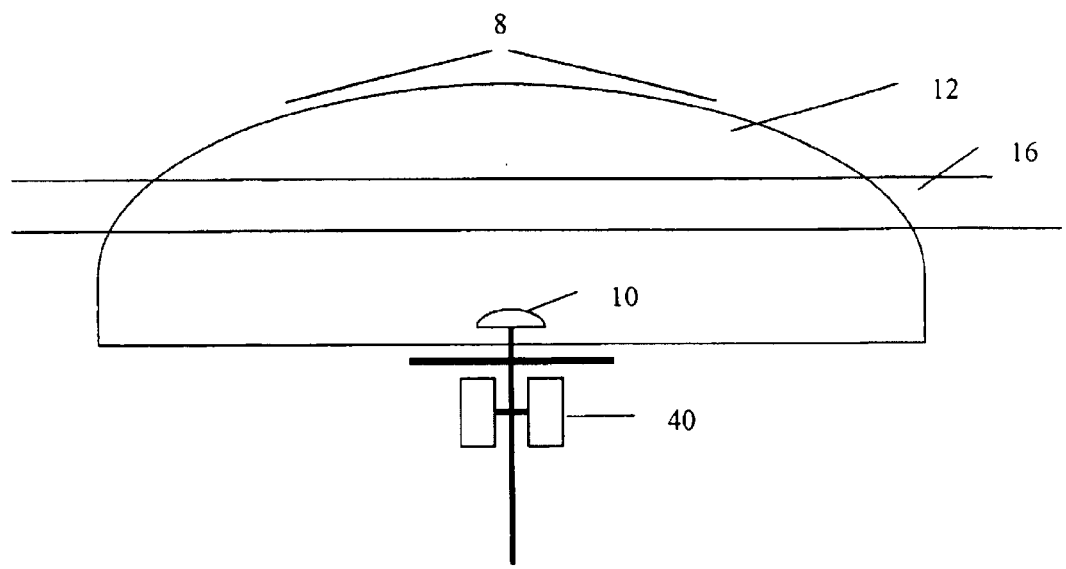
FIG. 6 illustrates a base station with an antenna having a stretched dome shaped propagation pattern.

FIG. 6 illustrates an air base station antenna 10 co-located with a ground base station antenna 40, according to an exemplary embodiment of the present invention. A stretched dome shaped antenna pattern 12 is associated with the air base station antenna 10, and extends radially outward in a 360 degree pattern in the horizontal plane, and approximately in a 180 degree pattern in the positive vertical plane above the earth. Note that FIG. 6 is an idealized representation of the stretched dome shaped antenna pattern. In practice the actual shape will vary depending on environmental conditions, the type of surrounding ground terrain and the specific mounting type and location used. The radius of curvature of the stretched dome around the center of the dome 8 is very large in order to provide an approximately equalized signal level as an aircraft (not shown) passes through the dome 12 in an air corridor 16.

The air corridor 16 in FIG. 6 shows the signal level varying only slightly as an airplane passes through the air space of the cell corresponding to the air base station antenna 10. In one embodiment, the ratio of the diameter of the dome versus the height of the dome may be 33 to 1. For example, the height of the dome may be about 30 Km and the radius of the dome may be about 500 Km. Other values for the height and radius of the dome may be used depending on the coverage requirements of a particular area such as an air corridor.

Additionally, the dome-shaped radiation pattern 12 is optimal for air-based users because radiated RF signals are directed into the airspace, and not to the ground where ground-based users are normally located. Further, this allows for low interference and noise levels with the ground system because the antenna system greatly attenuates the signal below the horizontal plane and has negligible sidelobe radiation. Similarly, the ground base station antenna 40 may have a receive pattern (not shown) pointing slightly downward to the earth to avoid receiving an aircraft's transmission. Orthogonal polarization may also be used between the air and ground system antennas to provide further isolation between the systems. Therefore, both the ground system and the ground-to-air system will maintain a proper C/I ratio using the antennas described.

Figure 6A:
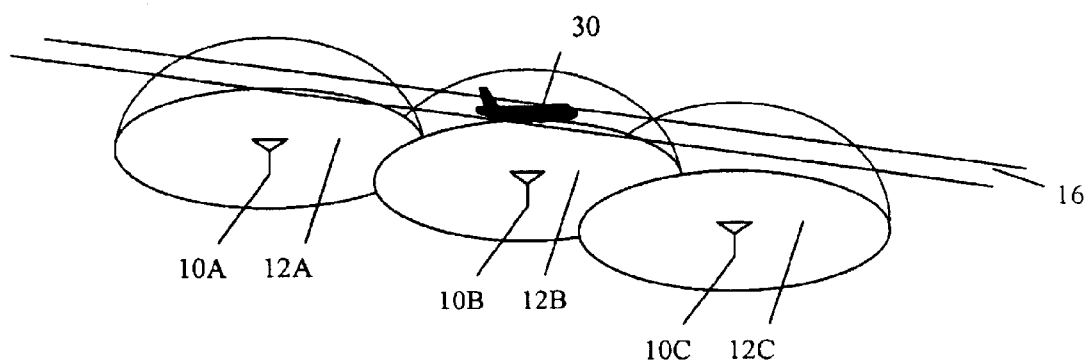
FIG. 6A illustrates a group of base stations for providing coverage each using an antenna having a stretched dome propagation pattern.

FIG. 6A illustrates the radiation pattern of three antennas 10A, 10B, and 10C having respective stretched dome shaped radiation patterns 12A, 12B, and 12C. The dome shaped radiation patterns 12A, 12B, and 12C are positioned in such a way as to provide coverage to an airplane 30 flying in an air corridor 16.

The radius of curvature of the stretched domes 12A, 12B, and 12C, allows the highest part of the dome to substantially enclose an air corridor 16. Therefore, as the airplane travels along the air corridor 16, the signal strength of the dome radiation pattern 12A, 12B and 12C can provide continuous communication to the aircraft 30.

A handover may occur as the aircraft 30 leaves the coverage area of one cell (12A for example) and passes into the coverage area of another adjacent cell (12B for example). During a call for instance, the air system 100 may monitor the receive signal strength from the airplane's transmission over the air interface 20 (shown in FIG. 5). When the signal strength from an adjacent air cell, 12B for example, is stronger by a threshold amount than the signal strength from the serving cell 12A for example, the system may then perform a handover from the serving cell 12A to the adjacent cell 12B. The adjacent cell 12B then becomes the new serving cell. Handovers, therefore, permit a call to span over multiple air cells. A similar handover procedure may be used to allow service to be transferred from a ground base station antenna to an air base station antenna.

Figure 7:
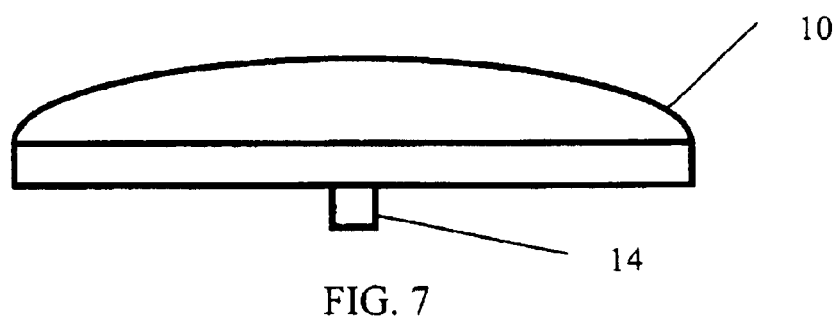
FIG. 7 illustrates a dome type antenna.

FIG. 7 illustrates a side view of a dome antenna 10. An antenna connector 14 allows a transmission line (such as the transmission line 50 shown in FIG. 5) to connect the dome antenna 10 to an air base station (such as the air base station 70 shown in FIG. 5). Dome antenna 10 may be used to produce the stretched dome radiation pattern 12 of FIG. 6.

Figure 8:
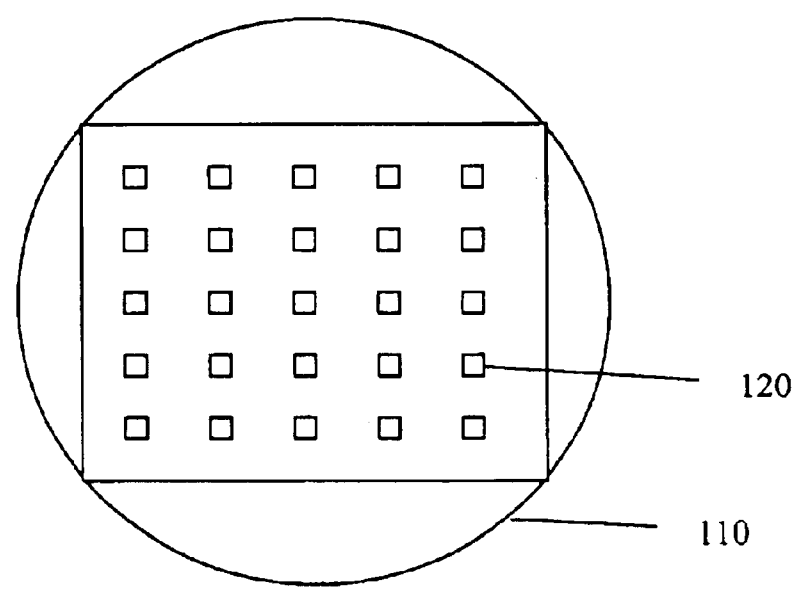
FIG. 8 illustrates an array type antenna corresponding to one embodiment of the present invention.
Figure 9:
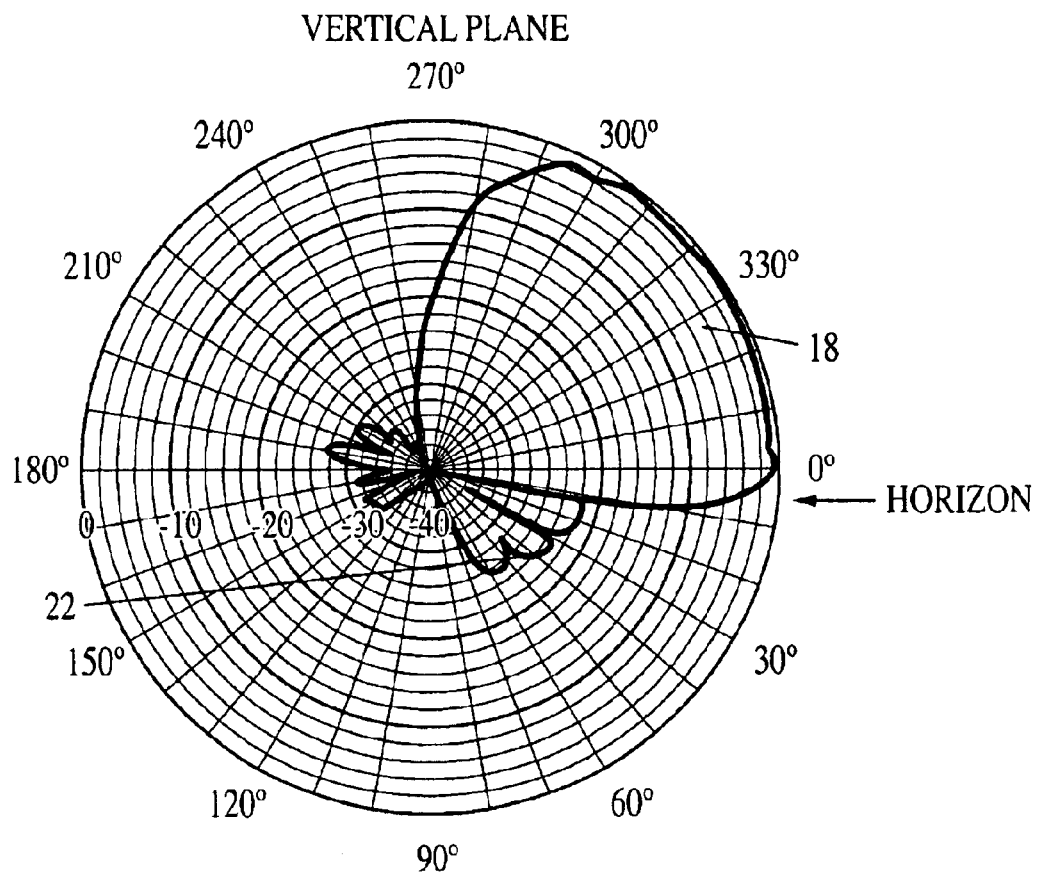
FIG. 9 illustrates the vertical view of a one antenna having a cardioid radiation pattern.

FIG. 8 illustrates an overhead view of an array type antenna 110 corresponding to one embodiment of the present invention. The antenna 110 is comprised of antenna array elements 120 coupled together to produce a desired radiation pattern, such as the dome shaped pattern 12. The antenna array elements 120 may be collinear dipoles, parallel dipoles, broadside crosses, and/or end-fire crosses. Other types of antenna array elements are also possible. The air base station antenna 10 of FIG. 5 may, for example, be the array type antenna 110. Alternatively, the array type antenna 110 may form a stretched dome shaped radiation pattern 12 as shown in FIG. 6. FIG. 9 illustrates a cardioid radiation pattern 18 in a vertical plane from a single antenna according to one embodiment of the invention. In this embodiment, the cardioid radiation pattern 18 has a 3 dB radiation beamwidth of substantially 60 degrees, however, other beamwidths can also be used. For example, beamwidths of 15 to 120 degrees (or others) can be used. Back lobes 22 are shown to be relatively minor when compared to the main beam of the cardioid radiation pattern 18. By suppressing the back lobes 22, the air space communication system is less likely to interfere with a ground cellular communication system. Advantageously, the use of a directional antenna may be used to provide coverage in a specific area while reducing interference in another area. For example, it is desirable to reduce interference in an area with heavy traffic or high distribution of subscribers.

Figure 10:
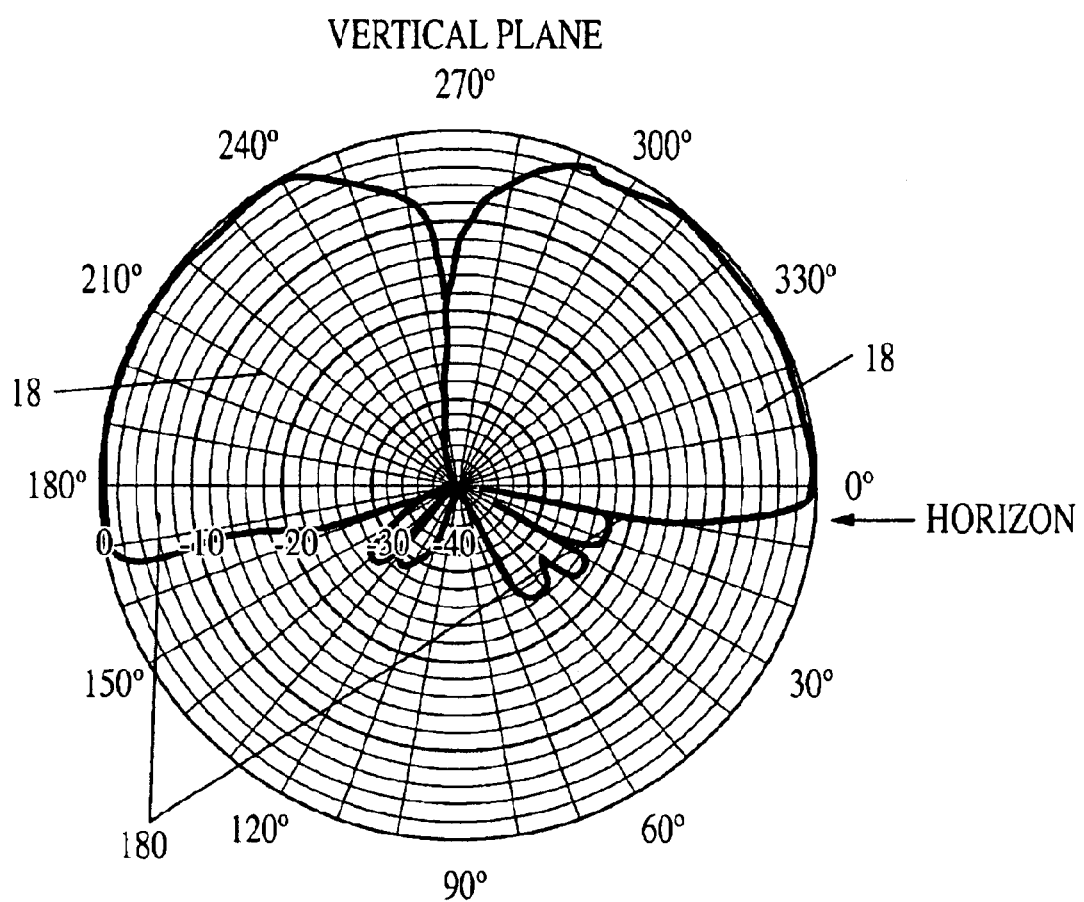
FIG. 10 illustrates the vertical view of a two antennas each having a cardioid radiation pattern.

FIG. 10 illustrates a radiation pattern of two antennas each having a cardioid radiation pattern 18 in a vertical plane according to another embodiment of the invention. The orientation of the two antennas may be placed in such a way as to permit custom coverage in an air corridor (not shown). Radiating signals substantially into an air corridor as opposed to a 360 degree horizontal pattern will likely reduce interference in a nearby ground cellular communication system.

Figure 11:
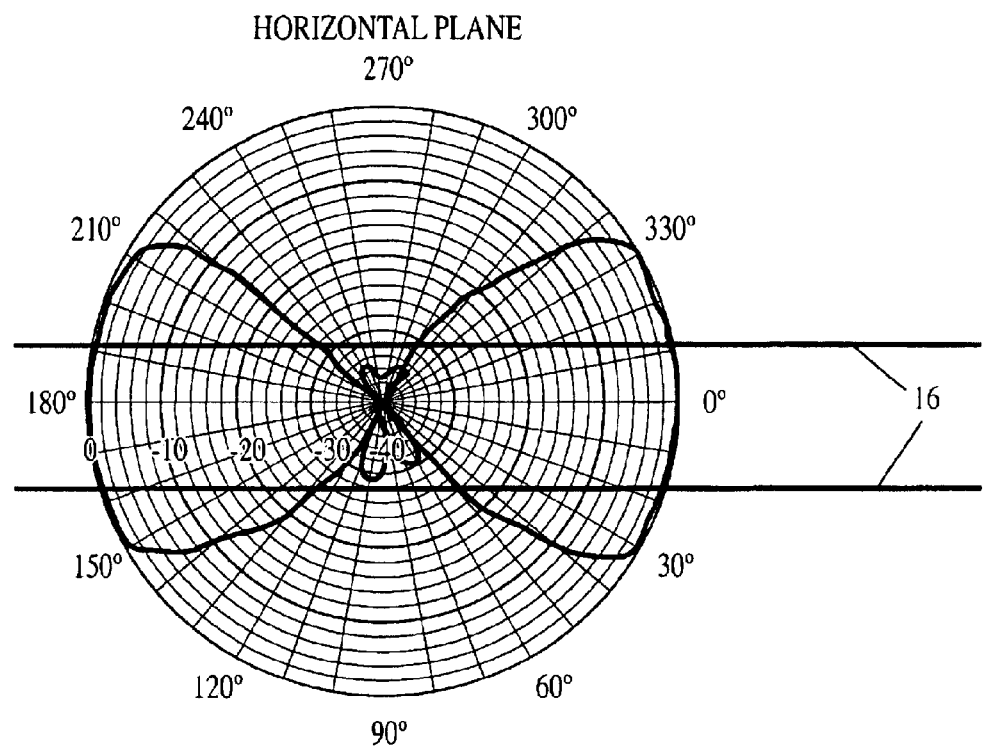
FIG. 11 illustrates the horizontal radiation pattern of two directional antennas.

FIG. 11 illustrates a horizontal radiation pattern corresponding to the vertical pattern 18 of FIG. 10 for two directional antennas. In the horizontal plane, each antenna shown has approximately a 120 degree beamwidth. The antennas are pointed 180 degrees apart to provide maximum coverage in the 0 degree and 180 degree directions. This orientation may be suitable for covering air corridors 16 in a "straight line". Advantageously, the caridoid pattern does not form substantial gaps at lower altitudes in between base stations. Other orientations may be possible in order to cover other types of airline corridors, which may include, for example, angles and curves. Thus, if 360 degrees of coverage is required, then three 120 degree beamwidth antennas may be combined to provide substantially 360 degrees of coverage in the horizontal plane.

Figure 12:
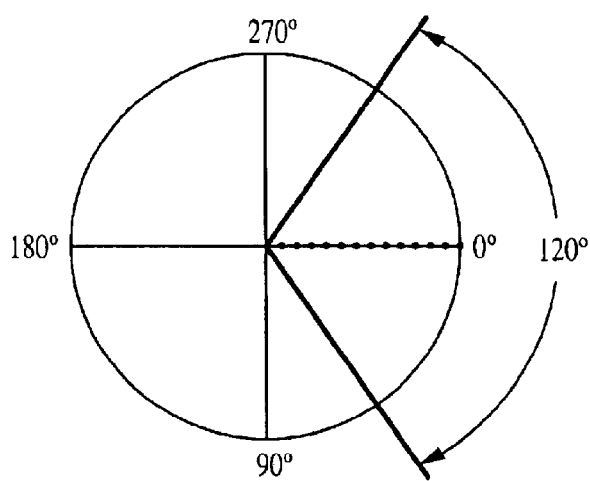
FIG. 12 illustrates the orientation and horizontal radiation pattern for a 120 degree beam width antenna.

FIG. 12 illustrates an orientation and the asymptotic horizontal radiation pattern for a single 120 degree antenna corresponding to the single directional antenna of FIG. 10. The pattern is shown oriented to a position of zero degrees (0°). Such an antenna pattern may be used to provide coverage to a specific portion of the air space. Other orientations are also possible in order to meet one or more specific air space parameters. In addition, multiple antennas may be combined in order to provide coverage in a larger area.

Figure 13:
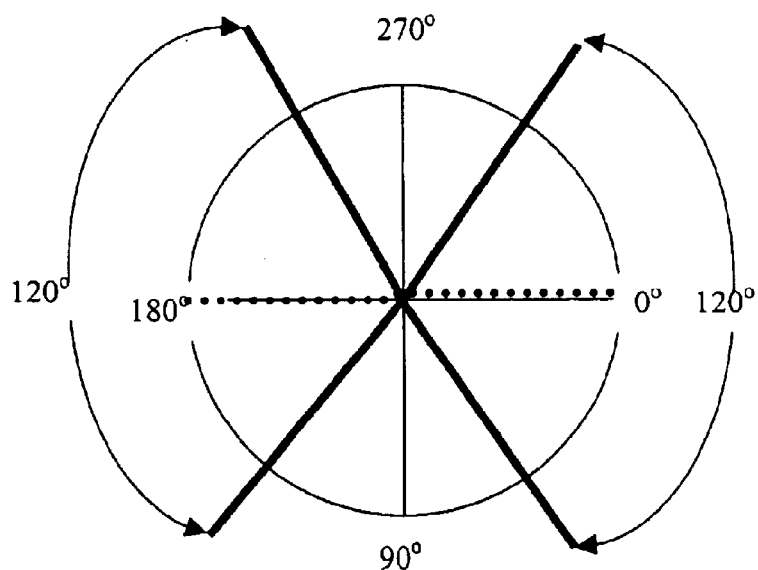
FIG. 13 illustrates an orientation and horizontal radiation pattern for two 120 degree beam width antennas spaced 180 degrees apart.

FIG. 13 illustrates an orientation and the asymptotic horizontal radiation patterns for two 120 degree antennas spaced 180 degrees apart. The first antenna is shown oriented at 0 degrees and the second antenna is oriented at 180 degrees. Other positions are also possible in order to meet one or more specified air space parameters. The combined radiation pattern of the two antennas provides air space coverage in a larger area than the coverage of a single antenna.

Figure 14:
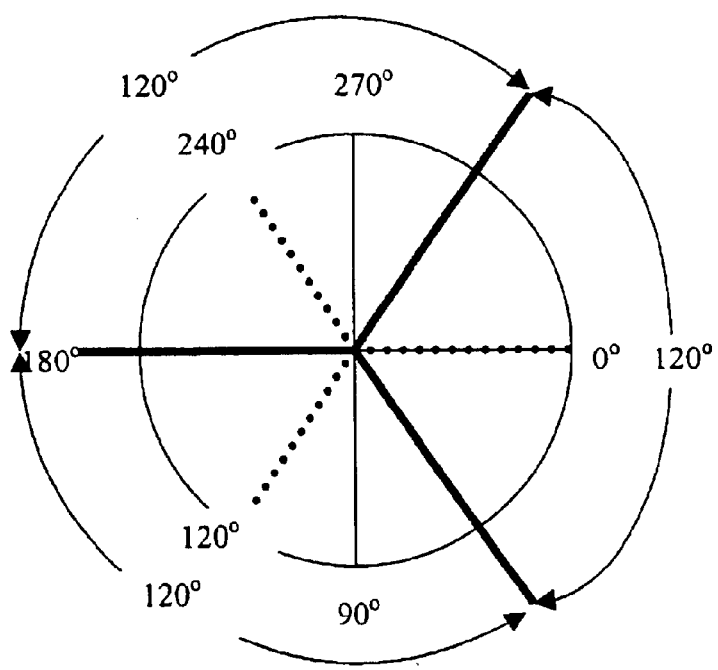
FIG. 14 illustrates an orientation and horizontal radiation pattern for three 120 degree beam width antennas spaced 120 degrees apart.

FIG. 14 illustrates an orientation and the asymptotic horizontal radiation pattern for three 120 degree antennas spaced 120 degrees apart. The respective orientations shown are 0, 120 and 240 degrees. Other positions may also be used to meet one or more specified air space coverage parameters. As stated previously, three 120 degree beamwidth antennas may be combined in order to provide substantially 360 degrees of coverage in the horizontal plane. Another advantage of combining two, three, or more antennas is that each antenna may be re-oriented in order to provide coverage in a more precise fashion during fine tuning of the system. Fine tuning and optimization, such as adjustment of antenna orientation, is preferably performed after coverage measurements are made and a system performance analysis is completed.

Antenna-Combining Schemes

Figure 15:
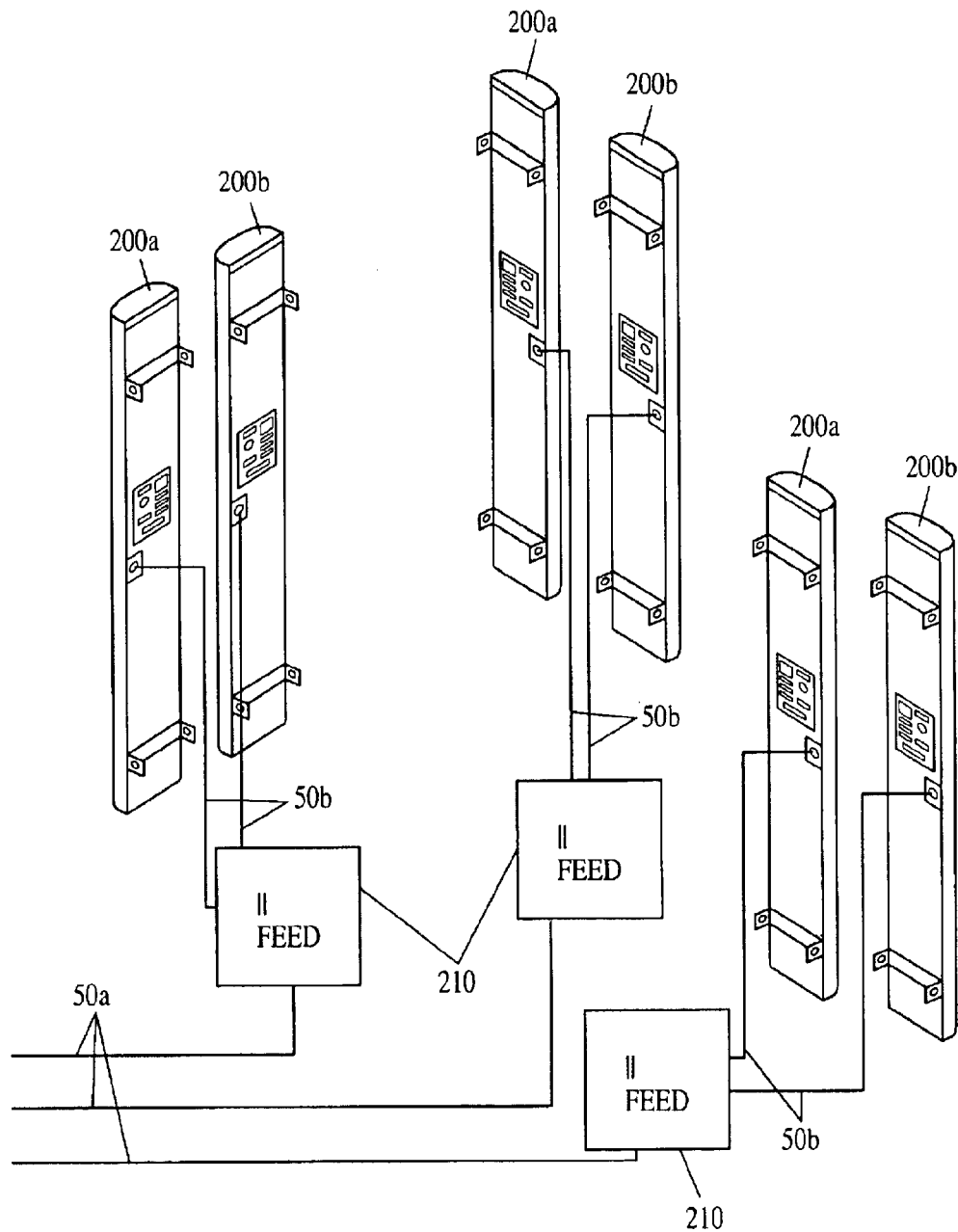
FIG. 15 illustrates an antenna combining scheme for three directional antennas.

FIG. 15 illustrates an antenna-combining scheme for use with three antennas 200. Such a combining scheme may, for example, be used to combine signals from antennas corresponding to the three antenna patterns shown in FIG. 14. Feed combiner 210 has as inputs, a group of transmit and receive signals over cable 50a from an air BTS 70 as shown in FIGS. 4 and 5. The output of the feed combiner 210 is a transmission feed line 50b to a pair of antennas 200a and 200b. The antennas 200a and 200b may have a cardioid shaped radiation pattern in the vertical plane as previously illustrated, or another appropriate radiation pattern. The antennas 200a–b may be separate transmit and receive antennas having similar beamwidths pointing as a pair in the same orientation, or alternatively, the antennas may be capable of simultaneously transmitting and receiving signals in different orientations in order to further control the air space coverage. Although three pairs of antennas 200a and 200b are shown in FIG. 14, other numbers of antennas may alternatively be used.

Other air base station configurations are possible based on the capacity and coverage requirements of the system. The number of antennas required will depend on such factors as the radiation pattern desired and the existence of any air corridors in the surrounding airspace. If, for example, additional coverage is required, then more antennas 200a and 200b may be added, and additional feed splitters and combiners 210 may be used to configure the base station. If additional capacity is required, additional transmitters and receivers may be added and optimized for the air BTS 70. Optimization of a cell may include performing coverage and interference tests to verify that the equipment configuration does not exceed the C/I limit.

In another embodiment, a vertical antenna radiates a narrow beam capable of tracking the aircraft in flight. Antennas systems capable of tracking a mobile user, ("smart antennas"), are capable of projecting a narrow beam to a mobile user. By transmitting a narrow beam, interference in the system is greatly minimized because the signal is transmitted primarily only to the aircraft at which the mobile user is a passenger.

Figure 16:
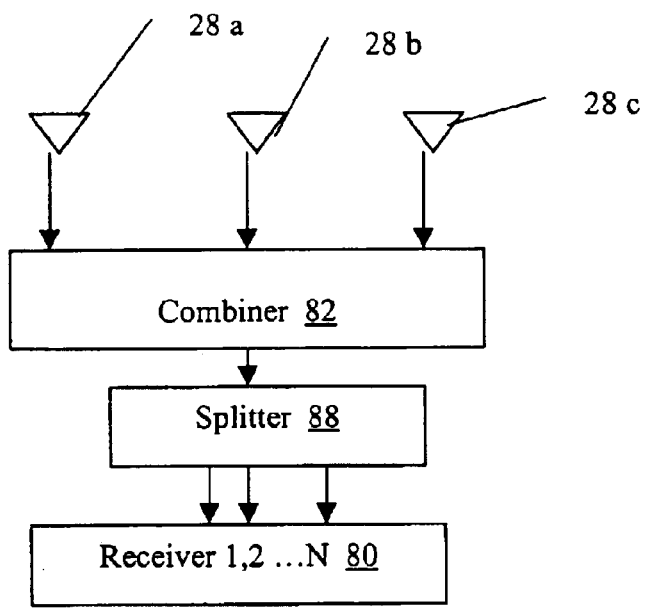
FIG. 16 is a block diagram depicting multiple receivers fed from a combiner/splitter and multiple receive antennas.

FIG. 16 is a simplified block diagram depicting a plurality of receivers 80 and multiple receive antennas 28a, 28b, and 28c. For example, the three receive antennas 28a, 28b, and 28c may each have 120 degree patterns to provide substantially 360 degrees of coverage in the horizontal plane, similar to what was shown in FIG. 14. If desired, the multiple receive antennas 28a, 28b, and 28c may be oriented to provide coverage in specific air corridors. Multiple receive antennas 28a, 28b, and 28c are each shown connected to a combiner 82. The combined signals are then split into separate signals by a splitter 88 in order to feed each of the plurality of receivers 80. Each of the plurality of receivers 80 therefore can receive a signal from any of the receive antennas 28a, 28b, and 28c. The number of receivers 80 may be based on the coverage and capacity requirements of the specific cell site. Although three antennas are shown in FIG. 16, other numbers of antennas may be used in this receiver configuration.

Figure 17:
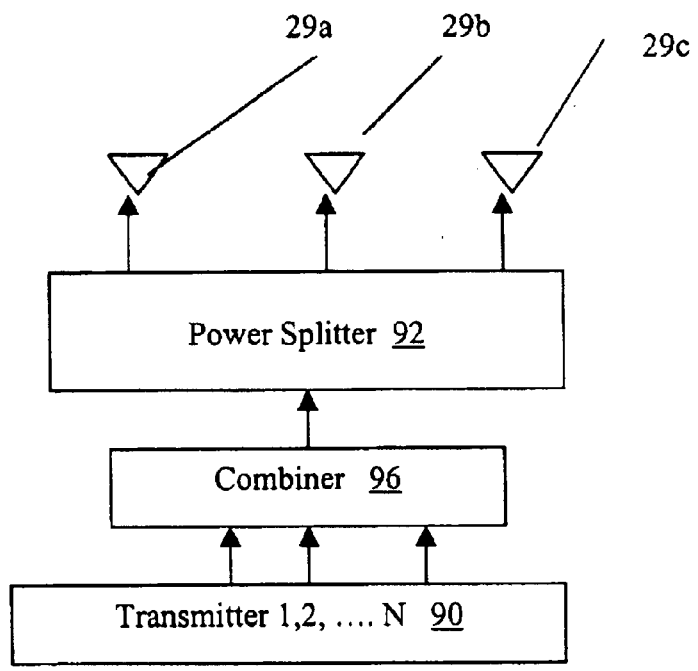
FIG. 17 is a block diagram depicting an illustrative interconnection scheme for multiple transmitters feeding a combiner/splitter and multiple transmit antennas.

FIG. 17 depicts an illustrative interconnection scheme for a plurality of transmitters 90 connected to a combiner 96 in order to combine transmit signals together. Splitter 92 then is connected to a plurality of transmit antennas 29a, 29b, and 29c in order to provide the combined transmit signals to each of the plurality of transmit antennas 29a, 29b, and 29c. The plurality of transmitters 90 provide the corresponding transmit signals to the complementary receiver system 80 of FIG. 16. The antennas 29a, 29b, and 29c may be oriented differently to provide customized coverage for a particular air cell site. This scheme also provides the advantage of increasing the capacity of an air BTS 70 by providing more than one transmitter 90. Additionally, another advantage of this scheme is that any of the transmitters can communicate with an aircraft located in any of the antennas 29a, 29b, and 29c. This is because the transmit signals from each of the plurality of transmitters 90 are radiated by the plurality of transmit antennas 29a, 29b, and 29c.

Figure 18:
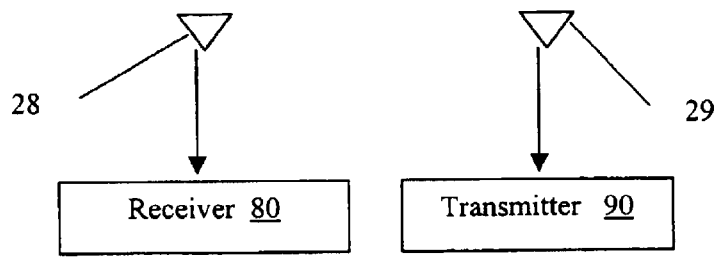
FIG. 18 is a block diagram depicting the interconnection scheme for a transmitter and receiver with one receive antenna and one transmit antenna.

FIG. 18 is a simplified block diagram depicting an interconnection scheme for a transmitter 90 coupled to a transmit antenna 29 and a receiver 80 coupled to a receive antenna 28. The antennas 28 and 29 may each physically be a single dome antenna in the vertical plane 12 providing 360 degrees of coverage in the horizontal plane. Alternatively, antennas 28 and 29 may be directional antennas each producing a cardioid shaped radiation pattern 18 as shown in FIG. 9 in order to provide coverage in a specific portion of air space, or to avoid interfering with another wireless communication system.

Figure 19:
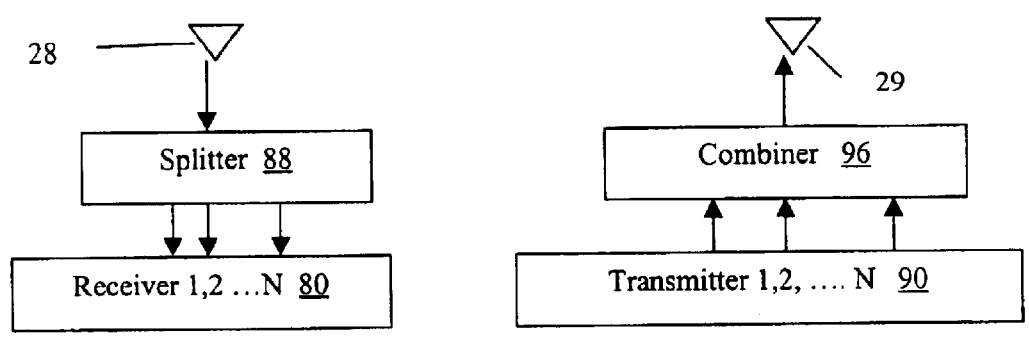
FIG. 19 is a block diagram depicting an illustrative interconnection scheme for multiple transmitters and a combiner feeding a single transmit antenna, and multiple receivers fed from a splitter and one receive antenna.

FIG. 19 is a block diagram depicting an illustrative interconnection scheme for providing additional capacity to an air BTS 70 using multiple transmitters 90 and multiple receivers 80. A plurality of transmitters 90 feed a combiner 96 in order to combine a group of signals into the output of combiner 96. The output of combiner 96 feeds a single transmit antenna 29 with signals from the plurality of transmitters 90. A receive antenna 28 feeds splitter 88 in order to feed a plurality of receivers 80. This configuration allows a site to provide additional capacity to support a greater number of subscribers by providing multiple transmitters 90 and receivers 80.

Figure 20:
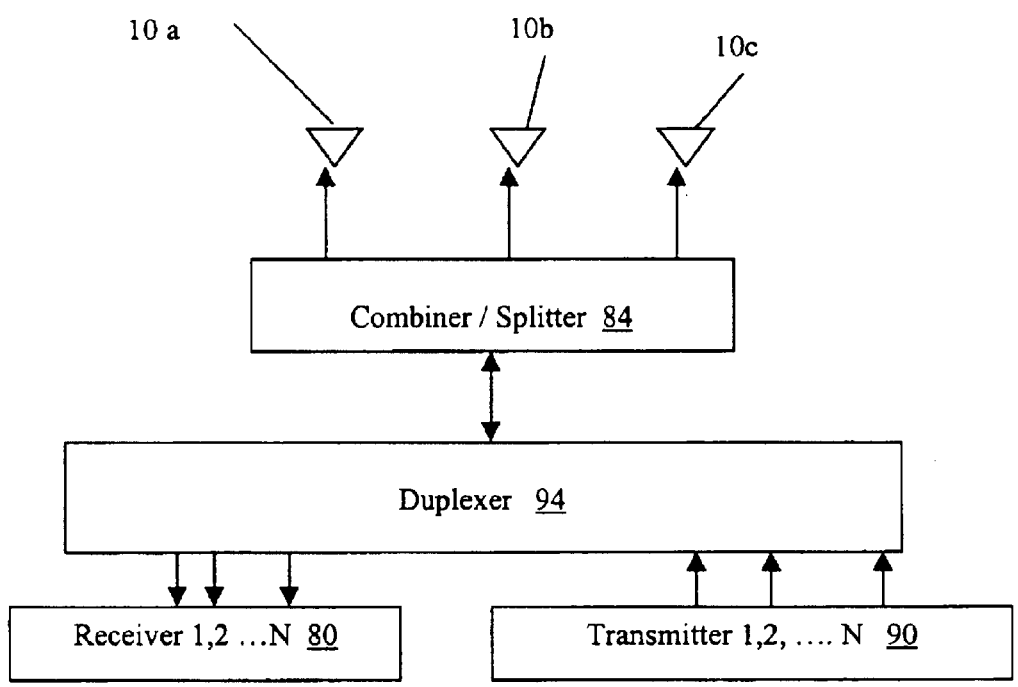
FIG. 20 is a block diagram depicting an illustrative interconnection scheme for coupling multiple receivers and transmitters to at least one transmit/receive antenna using a duplexer.

FIG. 20 is a block diagram depicting an interconnection scheme having a duplexer 94 to utilize a single antenna for both receiving and transmitting signals. A plurality of transmitters 90 are connected to the duplexer 94. The duplexer 94 is also connected to a plurality of receivers 80. The duplexer 94 is connected to an antenna 10 directly if only one antenna is utilized, such as a dome antenna 12 shown in FIG. 6. Alternatively, if multiple directional antennas 10a, 10b, and 10c are required, (e.g. to provide a specific radiation pattern), then a combiner/splitter 84 may be used to provide the duplexed receive and transmit signals to each of the multiple antennas 10a, 10b, and 10c. An advantage of using the duplexing technique is that separate transmit and receive antennas are not required. Therefore, fewer antennas are required and less mounting space is required on an antenna tower. For example, if coverage is desired in three different zones, then only three combined antennas 10a, 10b, and 10c are required instead of the three separate receive antennas 28a, 28b, and 28c shown in FIG. 16, and the three separate transmit antennas 29a, 29b, and 29c shown in FIG. 17.

Figure 21:
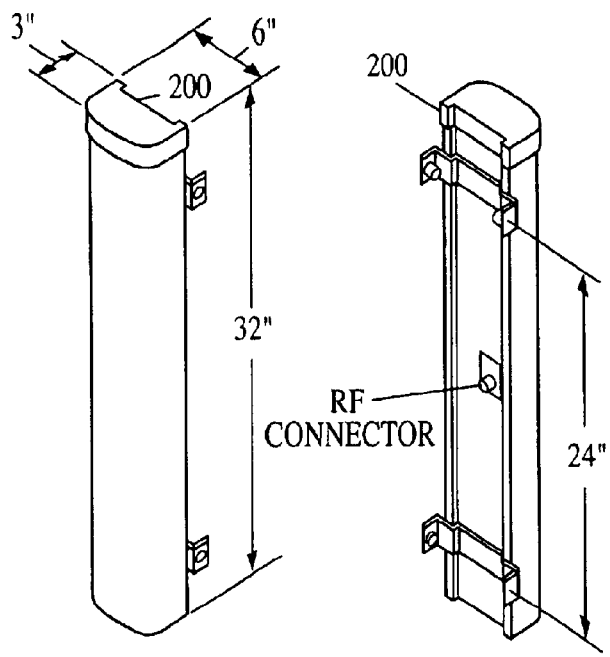
FIG. 21 is a pictorial representation of an exemplary base station antenna.

FIG. 21 is a pictorial representation of a base station antenna 200 having exemplary dimensions of 32 inches in length, 3 inches in width, and 24 inches between mounting brackets. The exact dimensions will be based on the frequency band used and the desired or specified horizontal and vertical antenna patterns. Typical frequency bands are between 700 MHz and 2.5 GHz. The antenna pattern of the antenna 200 may be the cardioid radiation pattern 18 shown in FIG. 9. An antenna defined by a cardioid radiation pattern 18 has a high front-to-back radiation ratio and may use reflector shields to direct the radiation of the antenna and phasing elements to create constructive and destructive interference in a desirable pattern. A high front-to-back ratio for the ground-to-air antenna will prevent ground-based users from interfering with ground-to-air base stations. In one embodiment, the antenna 200 is an element in the air base station antenna 10 shown in FIGS. 4 and 5.

Figure 22:
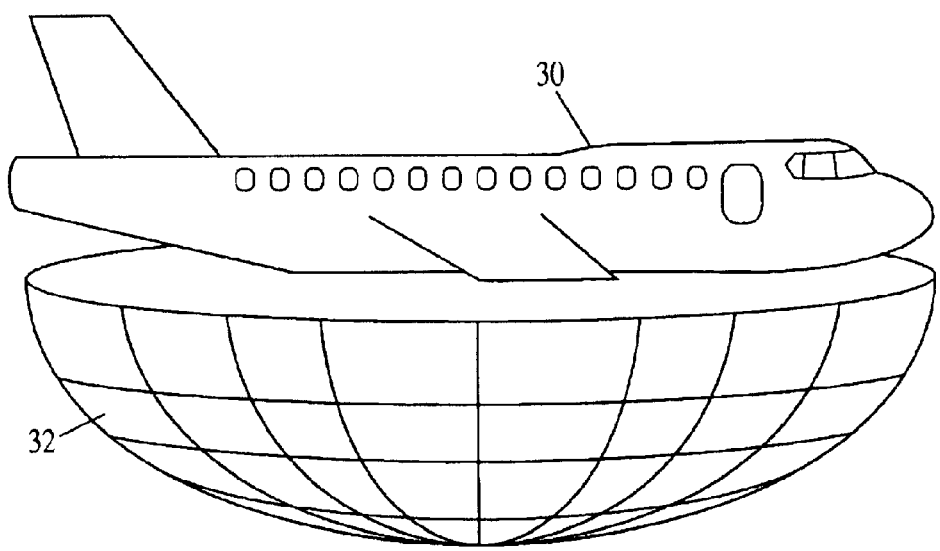
FIG. 22 depicts an exemplary radiation pattern for an airplane antenna.

FIG. 22 depicts an exemplary radiation pattern 32 for an aircraft antenna (not shown) situated on an aircraft 30. The horizontal radiation pattern is preferably shaped to cover 360 degrees and is radiated down from the aircraft "belly". This downward radiation, in combination with the skin of the aircraft 30, creates an RF shield from the radiated signal, such that the transmissions from the aircraft 30 will not interfere with passengers' mobile units inside the aircraft 30 nor with the aircraft's electronic systems and visa versa. Transmissions from an air base station received at an aircraft antenna on the aircraft 30 may be forwarded to passengers inside the aircraft 30 to enable the passengers to use their mobile wireless units. Similarly transmissions from the passengers may be forwarded to an aircraft antenna on the aircraft 30 without interfering with the aircraft's electronic systems. U.S. patent application Ser. No. 09/597530, entitled "Aircraft Wireless Communication System and Method," naming Anthony Sabatino, filed Jun. 20, 2000 as an inventor and assigned to the assignee of the present invention, describes such an in-aircraft system, and is hereby incorporated by reference.

The radiation pattern 32 need not be exactly spherical, or circular in the horizontal plane. The radiation pattern should provide communication to a base station in substantially any orientation while in flight or on the ground. Similarly, the radiation pattern in the vertical plane should provide communication to a base station in substantially any orientation while in flight or on the ground. For example, during a turn, the radiation pattern will preferably permit coverage even if the airplane 30 is in a roll.

Interference Control

The air-to-ground communication system 100 shown in FIGS. 4 and 5 may be designed to avoid interference with the ground cellular telecommunication system. An air-to-ground wireless telecommunication system 100 is preferably designed to maintain the required C/I ratio by using cellular engineering techniques such as proper frequency re-use selection, P.N. reuse selection, base station positioning, base station separation, antenna type, height, directivity, base station configuration type, and power output level. Therefore, the air-to-ground wireless telecommunication system 100 may be designed to meet subscriber traffic distribution requirements of a specific geographic coverage area while also operating within spectral and system interference constraints.

Additional techniques to control interference between the systems include: 1) the use of directional antennas 200 on the ground and on air-based equipment; 2) the use of adaptive power control to operate at the minimum output power level; 3) the use of orthogonally polarized antennas (e.g. horizontal on the air-based system and vertical on the terrestrial system); 4) the use of unique identity codes (i.e. PN, MID, SID codes in CDMA, IS-95, G3, TDMA, IS-54, or AMPS); 5) the use of positioning equipment such as GPS (Global Position System) to determine hand-over boundaries, 6) the use of separate frequencies between the air-based and terrestrial systems, and 7) the use of cell splitting where the cell may be split into smaller sub air cells in order to reduce the level of interference.

Yet another embodiment uses adaptive power control to minimize system interference by monitoring the receive signal strength at a receiver and maintaining the receive signal level within a "window". The receive window is defined by a predefined upper and lower signal threshold level at the receiver. If the receive signal level falls below the lower signal level, then a command to the transmitter is sent to increase power by a predetermined amount, such as 3 dB, 1 dB, 0.5 dB, or 0.1 dB. If the receive signal level exceeds the upper signal level of the window, then a command to the transmitter is sent to decrease power by a predetermined amount, such as 3 dB, 1 dB, 0.5 dB, or 0.1 dB. The size of the window is defined by the difference between the upper signal level and the lower signal level. The window effectively adds hysteresis to the system in order to prevent excessive power control communication. In this way, if the minimum power level is transmitted by all transmitters in the system, then the lowest level of interference will be realized in the system.

Yet another embodiment uses multiple antennas positioned strategically inside the aircraft so that the power transmitted from the handsets is maintained at very low levels. These very low levels may assist in reducing any possible interference to navigation equipment on the aircraft.

Interference may thus be controlled using one or more of the techniques described above. Interference in the base station forward and reverse links may be maintained by using the antenna patterns and combinations of the described and equivalent antenna designs in conjunction with the interference control measures identified above. Therefore, the system provides an air to ground communication system where a user may conveniently utilize a personal mobile wireless unit within an aircraft.

Preferred and alternative embodiments of the present invention have been illustrated and described. It will be understood, however, that changes and modifications may be made to the invention without deviating from its true spirit and scope, as defined by the following claims.

I claim:

1. A system for use in providing wireless communication service between a base station and an aircraft, the system comprising:

an antenna system disposed at the base station and producing a radiation pattern directed upward into an air space above the antenna system;

the radiation pattern defining a stretched dome shape;

the stretched dome shape defining a substantially circular pattern about an axis substantially normal to the surface of the earth and further defining a first surface portion closest to the axis but farthest from the surface of the earth and a second surface portion farthest from the axis but closest to the surface of the earth; and in a plane normal to the surface of the earth, the stretched dome shape defining a variable radius of curvature extending from a largest radius of curvature at the first surface portion to a smallest radius of curvature at the second surface portion, whereby, when the aircraft is disposed within the radiation pattern, signals may be communicated within the radiation pattern between the base station and the aircraft.

2. The system of claim 1, wherein the antenna system comprises a plurality of antenna elements.

3. The system of claim 1, wherein the antenna system consists of a single antenna element.

4. The system of claim 1, wherein the antenna system is coupled to the base station.

5. The system of claim 1, further comprising an external antenna disposed on an exterior portion of the aircraft, whereby, when the external antenna is disposed within the radiation pattern, signals may be communicated within the radiation pattern between the base station and the external antenna.

6. A method of establishing a radiation pattern for use in providing wireless communication service between a base station antenna system and an aircraft, the method comprising:

radiating bi-directional signals between the base station antenna system and the aircraft in a stretched dome shaped radiation pattern directed upward into an air space above the base station antenna system, wherein the stretched dome shape defines a substantially circular pattern about an axis substantially normal to the surface of the earth and further defines a first surface portion closest to the axis but farthest from the surface of the earth and a second surface portion farthest from the axis but closest to the surface of the earth, and wherein, in a plane normal to the surface of the earth, the stretched dome shape defines a variable radius of curvature extending from a largest radius of curvature at the first surface portion to a smallest radius of curvature at the second surface portion.

7. The method of claim 6, wherein the bi-directional signal comprises a transmit signal and a receive signal, the method further comprising:

transmitting the transmit signal from at least one transmit antenna disposed at the base station; and receiving the receive signal from at least one receive antenna disposed at the base station.

8. The method of claim 7, wherein the transmit signal defines a transmit signal strength, and the receive signal defines a receive signal strength, the method further comprising:

increasing the transmit signal strength in response to a determination that the receive signal strength is less than a first threshold level; and decreasing the transmit signal strength in response to a determination that the receive signal strength is greater than a second threshold level.

9. An aircraft antenna system for providing wireless communication service between a base station and an aircraft, comprising:

the aircraft antenna system disposed at the aircraft and producing a radiation pattern directed into an air space below the aircraft;

the radiation pattern defining a stretched dome shape;

the stretched dome shape defining a substantially circular pattern about an axis substantially normal to the direction of flight and further defining a first surface portion closest to the axis but farthest from the aircraft and a second surface portion farthest from the axis but closest to the aircraft; and in a plane normal to the direction of flight, the stretched dome shape defining a variable radius of curvature extending from a largest radius of curvature at the first surface portion to a smallest radius of curvature at the second surface portion, whereby, when the base station is disposed within the radiation pattern, signals may be communicated within the radiation pattern between the base station and the aircraft.

* * * * *